US012731562B2

(12) United States Patent
Gay

(10) Patent No.: US 12,731,562 B2
(45) Date of Patent: Sep. 8, 2026

(54) IMPEDANCE VARIATOR FOR A WIND INSTRUMENT

(71) Applicant: André Gay, Marseilles (FR)

(72) Inventor: André Gay, Marseilles (FR)

( * ) Notice: Subject to any disclaimer, the term of this patent is extended or adjusted under 35 U.S.C. 154(b) by 343 days.

(21) Appl. No.: 18/692,011

(22) PCT Filed: Sep. 13, 2022

(86) PCT No.: PCT/EP2022/075439
§ 371 (c)(1),
(2) Date: Apr. 8, 2024

(87) PCT Pub. No.: WO2023/041538
PCT Pub. Date: Mar. 23, 2023

(65) Prior Publication Data
US 2024/0379077 A1 Nov. 14, 2024

(30) Foreign Application Priority Data
Sep. 14, 2021 (FR) ...................................... 2109604

(51) Int. Cl.
*G10D 9/00* (2020.01)

(52) U.S. Cl.
CPC ...................................... *G10D 9/00* (2013.01)

(58) Field of Classification Search
CPC ............ G10D 9/00; G10D 7/02; G10D 7/066; G10D 7/08; G10D 9/01; G10D 7/00
See application file for complete search history.

(56) References Cited

U.S. PATENT DOCUMENTS 4,428,271 A 1/1984 Winslow et al.
8,217,248 B1 7/2012 Feliciano
2015/0243265 A1* 8/2015 Laukat ..................... G10D 7/00
84/398

FOREIGN PATENT DOCUMENTS

DE 202012010318 U1 2/2013

OTHER PUBLICATIONS

International Search Report issued on Jan. 10, 2023, in corresponding International Application No. PCT/EP2022/075439, 5 pages.

* cited by examiner

*Primary Examiner* — Kimberly R Lockett
(74) *Attorney, Agent, or Firm* — Maier & Maier, PLLC

(57) ABSTRACT

An impedance variator for limiting or suppressing the parasitic harmonics of a wind musical instrument, the impedance variator including at least one permanent magnet, the impedance variator including a brass tube intended to surround a substantially tubular or cylindrical portion of the wind instrument and the impedance variator including a manner for fastening the tube on the portion of the wind instrument.

15 Claims, 7 Drawing Sheets

[Fig. 1]
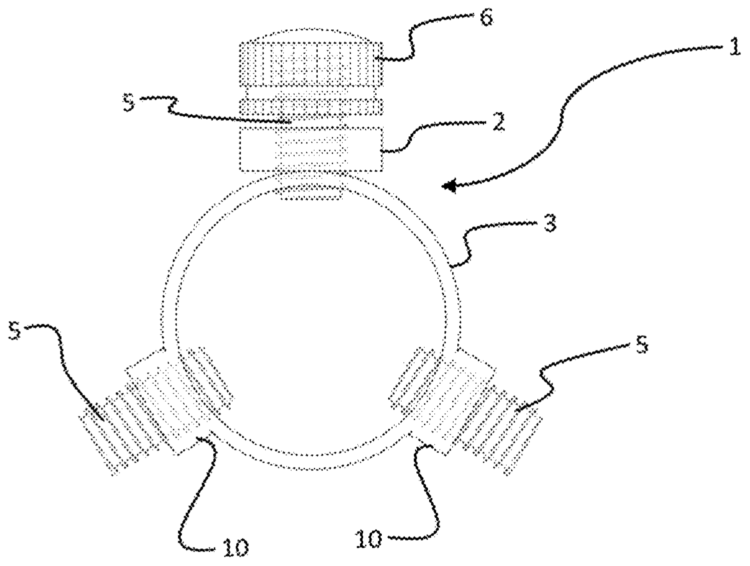
[Fig. 2]
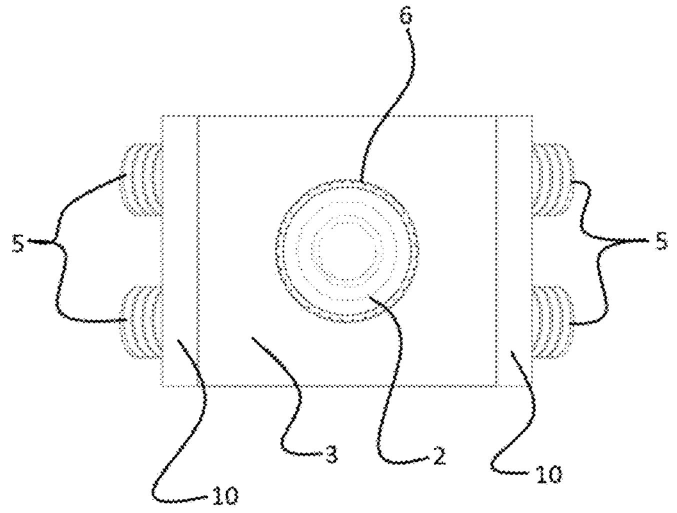

[Fig. 3]
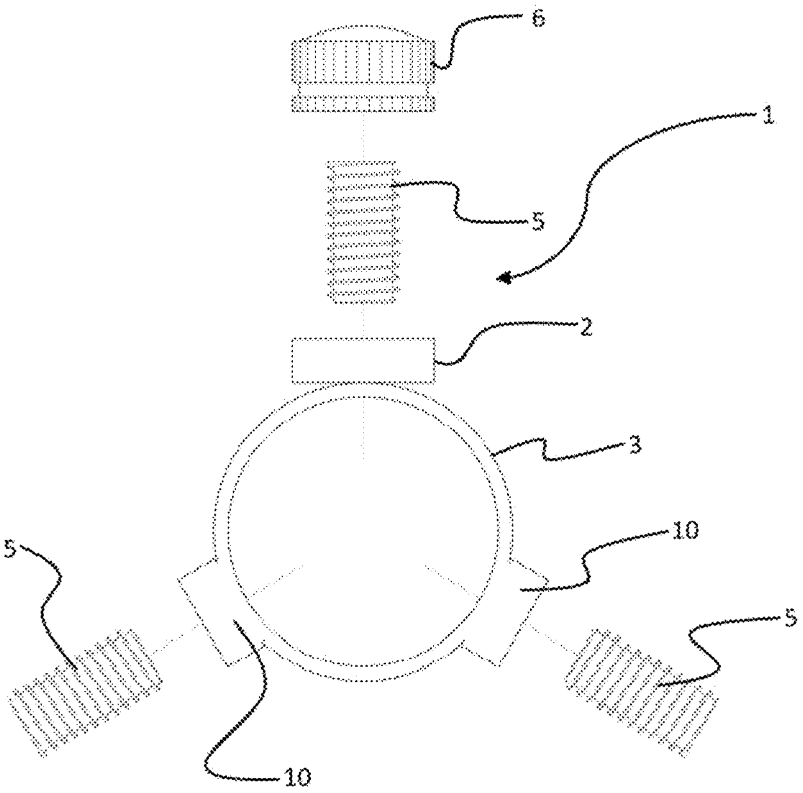

[Fig. 4]
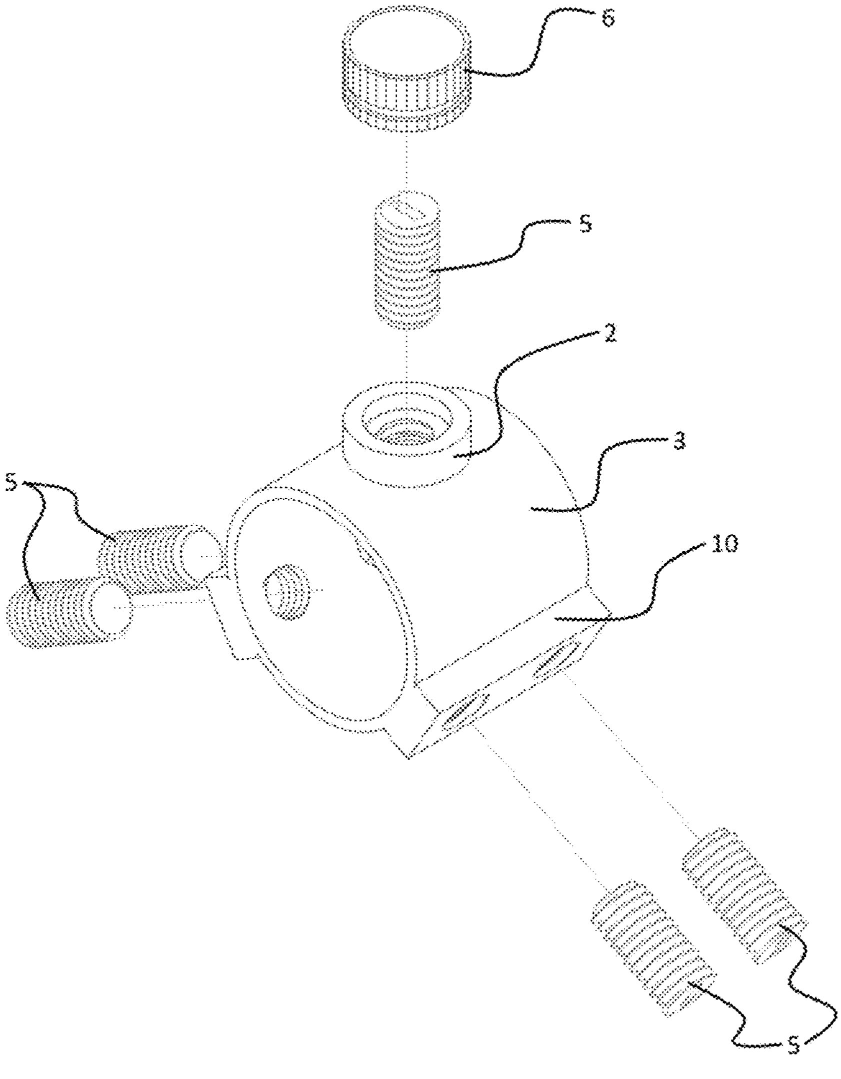

[Fig. 5]
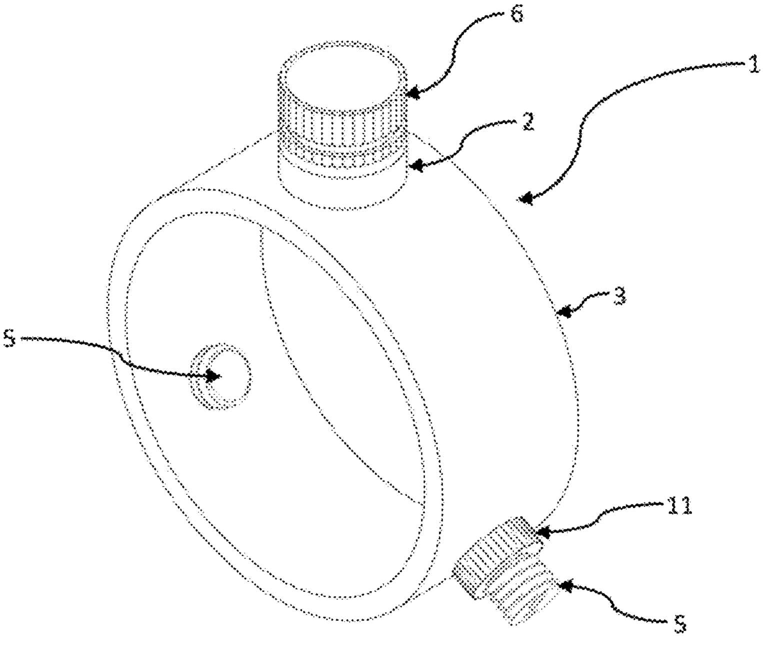

[Fig. 6]
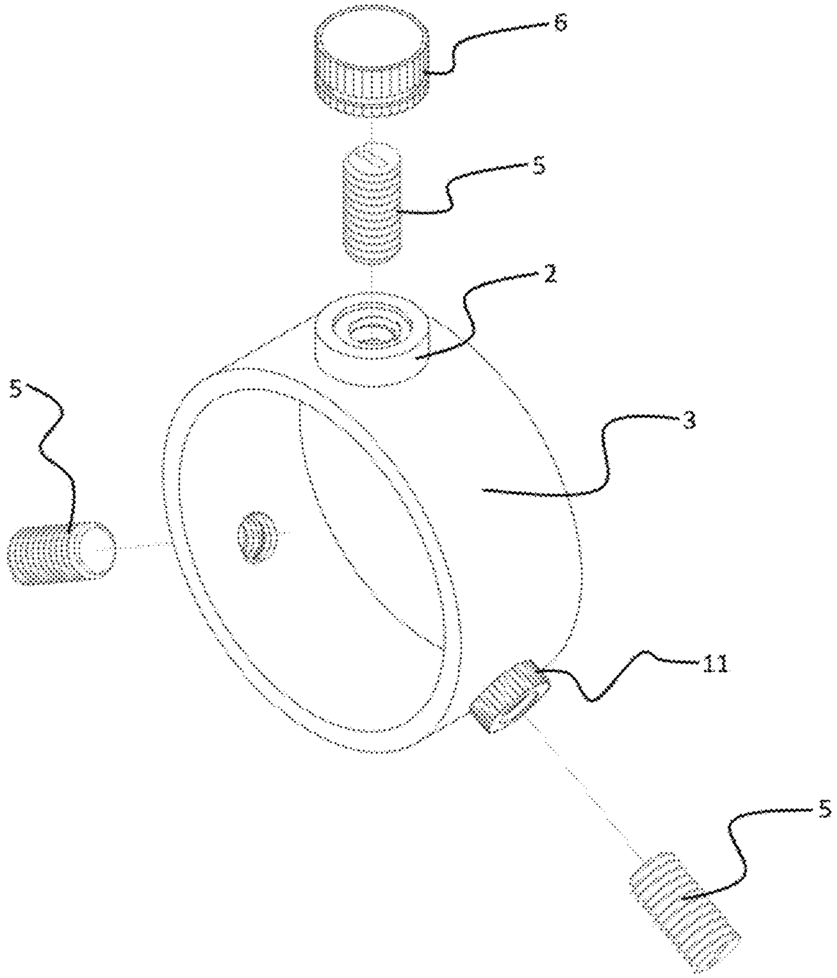

[Fig. 7]
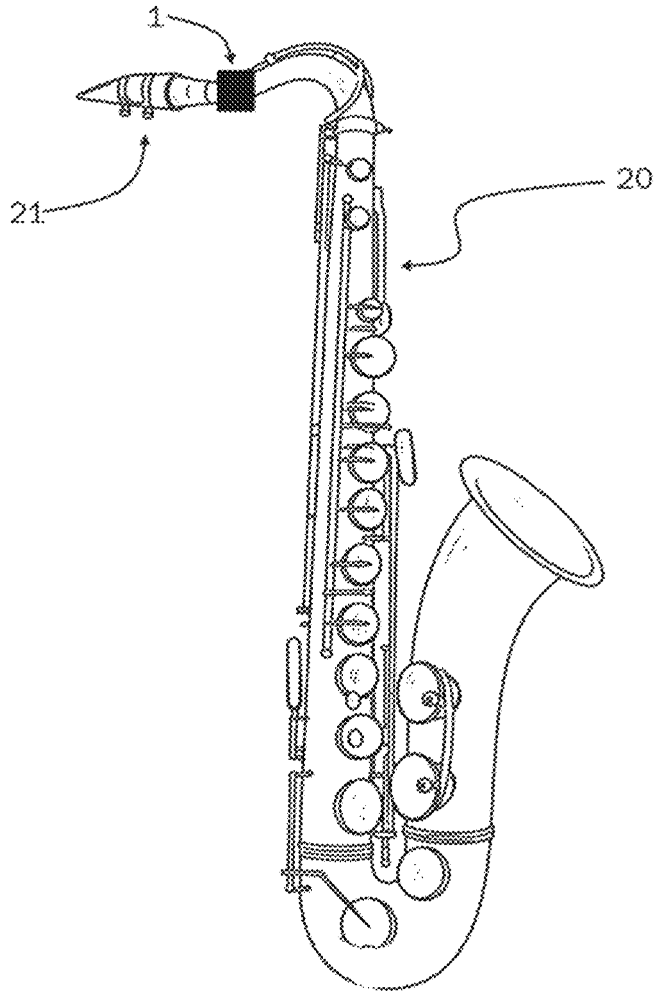

[Fig. 8]
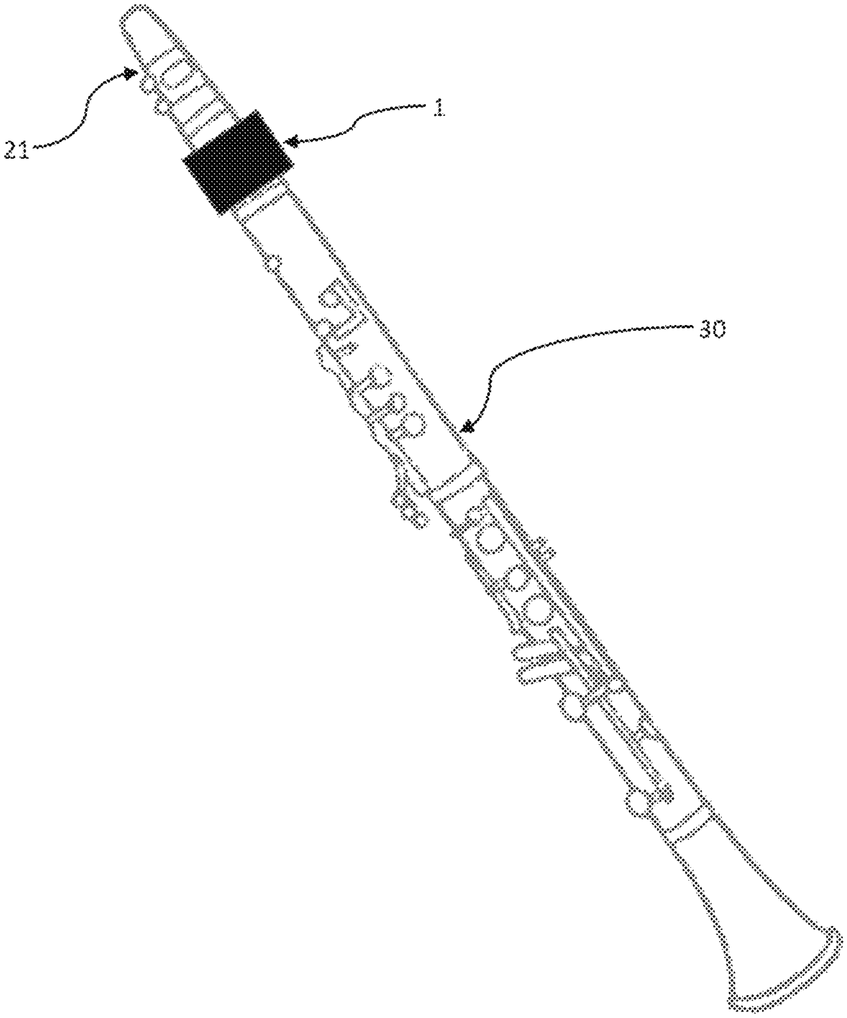

IMPEDANCE VARIATOR FOR A WIND INSTRUMENT

TECHNICAL FIELD

An object of the present invention is an impedance variator for a wind instrument.

It relates to the technical field of impedance variator apparatuses whose function aims to limit non-harmonic sounds, in other words to suppress parasitic harmonics. The present invention also relates to a wind instrument including such an impedance variator, more particularly the impedance variator according to the invention is in particular, yet not exclusively, intended for a trumpet or a horn.

BACKGROUND

During the manufacture of a wind instrument, the luthier focuses on the correctness, the timbre and the ease of play of the instrument. This results in an impedance, but of course each musician practices differently with the same wind instrument. For example, besides the technique, each musician has a different blow so that parasitic harmonics are likely to appear with some musicians rather than others for the same instrument. Thus, an impedance variator will allow limiting its parasitic harmonics by being placed on a specific portion of the instrument.

Impedance variators are known in the prior art such as:

"Variospec": this impedance variator is no longer used at the current time, but it requires a modification of the instrument with drilling and welding.

"Lefreque" system: this impedance variator is used for wind instruments, but it has a very large number of different materials that the musician should select to obtain the desired sound. Moreover, this impedance variator comprises the assembly of two plates together with elastic bracelets, which is complex and not visually aesthetic.

In the prior art, the document U.S. Pat. No. 10,013,958 is also known which describes an impedance variator for a saxophone. This impedance variator is fastened between two branches of the saxophone and comprises a complex assembly of round and circular parts on top of one another.

The document U.S. Pat. No. 8,283,541 is known which describes a ligature for wood-made wind instruments allowing reducing the frequencies of interfering vibrations. This ligate comprises a flexible strip made of brass but this device does not comprise any permanent magnet. Moreover, this ligature should be fastened on the spout of the wind instrument.

The document U.S. Pat. No. 7,220,903 is also known which discloses an assembly for a wind instrument spout wherein a retention plate provided with tabs conforms to the shape of the grooves present on the spout. This plate is adjustable through a screwing action to apply a variable pressure on the base of the blade.

Finally, the documents U.S. Pat. Nos. 7,220,903, 8,217,248, 5,644,095, JP 5400241, U.S. Pat. Nos. 9,721,546 and 4,428,271 are known but all these solutions described in these documents are not very effective, not very aesthetic, often complex, barely resistant, not practical to install/mount and/or difficult to calibrate. The document U.S. Pat. No. 8,217,248 may be considered as the closest state of the art.

The invention aims to remedy this situation.

In particular, an objective of the invention is to provide an impedance variator that is easy to set up on the wind instrument and very effective to reduce and possibly suppress non-harmonic sounds.

An essential objective is to provide a simple variator, having only few parts or components.

A complementary objective is to provide a low-cost impedance variator.

SUMMARY

Thus, it has been noticed by the Applicant, after various experiments and manipulations, that it is particularly interesting to make an impedance variator in the form of a brass tube clasping a tubular or cylindrical portion of the wind instrument (the spout excluded), said impedance variator also being fitted with a permanent magnet.

The solution proposed by the invention is an impedance variator for limiting or suppressing the parasitic harmonics of a wind musical instrument, the impedance variator including at least one permanent magnet.

The impedance variator is remarkable in that it comprises a brass tube intended to surround a substantially tubular or cylindrical portion of the wind instrument and in that the impedance variator comprises a means for fastening the tube on said portion of the wind instrument, wherein the fastening means includes a plurality of worm screws each penetrating throughout the tube, the inner end of each worm screw bearing against the outer surface of the portion of the wind instrument, the penetration length of each worm screw inside the tube being adjustable, wherein the worm screws are distributed or arranged over the circumference of the tube, while forming an angle comprised between 100° and 140° therebetween.

By "substantially tubular or cylindrical" with reference to a portion of the wind instrument, it should be understood that this portion has a tubular or cylindrical section, or substantially as such, i.e. this portion could be inscribed between two tubes of different diameters or two cylinders of different diameters.

Thanks to the impedance variator according to the invention, the parasitic harmonics are suppressed by a simple, optimum mounting and setting with regards to the result and generally final, i.e. which does not require any other subsequent setting.

A remarkable effect of the device according to the invention lies in the sound timbre which is particularly significantly improved.

Moreover, this impedance variator fits perfectly to the wind instrument and is visually difficult to detect.

Furthermore, this impedance variator can be dismounted very easily and quickly, in particular in order to transfer it onto another wind instrument, brass having a colour that is very close to the colour of the wind instrument.

It should be noted herein that impedance measurement tests at the outlet of the wind instrument have been carried out and show a very significant improvement of this impedance at the outlet, in other words the parasitic sounds are properly suppressed. The result is a round, full, powerful sound, facilitating the play of the instrumentalist over the entirety of the tessitura of the instrument.

Thus, the impedance variator, also referred to as "booster" with regards to its effect on the sound timbre, has been tested in Cite de la Musique in Marseille and has demonstrated exceptional qualities. In particular, the feeling with regards to the suppression of parasitic harmonic frequencies is immediate and the impedance variator or Booster according to the invention facilitates the accuracy of note attacks. Furthermore, the sound is rounded and access to the serious and acute registers is substantially facilitated.

The impedance variator or booster has also been tested, in particular on trombones, trumpets and flutes, with the musicians of Opera de Toulon and the Ad Libitum quintet. The results and feelings are identical, i.e. excellent like those of Cite de la Musique.

Similarly, quite many professionals have carried out very conclusive tests on saxophones.

In particular, one could note that the general feeling of musicians and listeners is that the vibration of the air column requires less blowing, the sound timbre is modified and access to the entirety of the tessitura is substantially facilitated. The removable nature of the impedance variator or booster—in other words the possibility of placing it at different locations on the instrument—allows optimising the setting.

For simplicity, the data of the tests and their results are not described herein, but are available on demand.

Moreover, the particular setting of the impedance variator belongs to each musician (or a/his/her instrumentalist) to the extent that the latter wishes a more or less brilliant or higher or lower sound, or else a brighter or on the contrary darker sound. To do so, the impedance variator will be arranged at different locations on the instrument and mounted more or less tightened against a wall of the instrument.

Other advantageous features of the apparatus object of the invention are listed hereinbelow. Each of these features may be considered alone or in combination with the remarkable features defined hereinabove. Each of these features contributes, where appropriate, to the resolution of specific technical problems defined hereinbefore in the description and to which the remarkable features defined hereinabove do not necessarily contribute. The latter may, where appropriate, be the object of one or more divisional patent application(s):

Next, the terms “inner” and “outer” are used to refer to a face, a side, an element, etc., located inside or directed towards the inside of the brass tube and the term “outer” to refer to a face, a side, an element, etc., located outside or directed towards the outside of the brass tube.

Advantageously, the brass tube has a thickness comprised between 1 mm and 3 mm, preferably a thickness of 2 mm.

According to an advantageous embodiment of the invention, the fastening means includes a plurality of worm screws each penetrating throughout the tube, the inner end of each worm screw bearing against the outer surface of the portion of the wind instrument, the penetration length of each worm screw inside the tube being adjustable.

In this embodiment, advantageously, the fastening means further comprises at least one brass setting knob, fastened at the outer end of a worm screw, for setting the penetration length of the worm screw into the tube. This or these worm screw(s), also referred to as setting screws, come into contact with the walls of the portion of the wind instrument.

Preferably, each worm screw includes a brass setting knob at its outer end.

Preferably, the worm screws are distributed or arranged over the circumference of the tube while forming an angle comprised between 100° and 140° therebetween, preferably an angle of 120°.

Advantageously, the worm screws are made of a non-metallic material, advantageously made of nylon.

Preferably, the permanent magnet is fastened on the brass tube, outside said tube.

It is also possible to consider the impedance variator according to the invention including a plurality of permanent magnets, distributed symmetrically all around the circumference of the brass tube.

Advantageously, the internal diameter of the brass tube is comprised between 15 mm and 25 mm, preferably between 18 mm and 22 mm, whereas the length of the tube is comprised between 15 mm and 35 mm.

Advantageously, at least one spar, preferably a plurality of brass spar(s), is/are fastened on the outer surface of the brass tube, advantageously this/these spar(s) extend(s) in the lengthwise direction of the tube.

According to one possibility offered by the invention, the outer surface of the brass tube, possibly the outer surface of the spar(s), possibly as well as the outer surface of the setting knob(s), is/are varnished or platinised or plated with silver or gold, advantageously the silver or gold plating having a thickness of 6 microns.

According to an advantageous embodiment, the permanent magnet has an external diameter comprised between 8 and 12 mm, preferably 10 mm, and a thickness comprised between 1 and 5 mm, preferably 3 mm.

The present invention also relates to a wind instrument, preferably consisting of a saxophone, a clarinet or a flute, having fixed around a substantially tubular or cylindrical portion of the wall an impedance variator as previously described.

Advantageously, the saxophone may consist of an alto, tenor or baryton saxophone.

Advantageously, said instrument includes a spout and the impedance variator is fastened at a distance from the spout comprised between 0.5 cm and 2.5 cm, preferably at a distance from the spout comprised between 1 cm and 3 cm.

BRIEF DESCRIPTION OF THE FIGURES

Other advantages and features of the invention will appear more clearly upon reading the description of a following preferred embodiment, with reference to the appended drawings, made as indicative and non-limiting examples and wherein:

FIG. 1 is a schematic illustration of an embodiment of an impedance variator according to the invention.

FIG. 2 is a top view of the impedance variator shown in FIG. 1.

FIG. 3 is an exploded front view showing all of the elements composing the impedance variator of FIGS. 1 and 2.

FIG. 4 is an exploded perspective view showing all of the elements composing the impedance variator of FIGS. 1 and 2.

FIG. 5 is a schematic illustration of another embodiment of an impedance variator according to the invention.

FIG. 6 is an exploded perspective view showing all of the elements composing the impedance variator of FIG. 5.

FIG. 7 is a schematic view of an alto saxophone on which an impedance variator according to the invention is mounted or fastened.

FIG. 8 is a schematic view of a clarinet on which an impedance variator according to the invention is mounted or fastened.

DETAILED DESCRIPTION OF THE EMBODIMENTS

The impedance variator 1 according to the invention includes, as an essential element, at least one permanent magnet 2 as well as a brass tube 3—also referred to by the expression "brass ring"—intended to surround a substantially tubular or cylindrical portion of the wind instrument.

A means 5, 6 for fastening the brass tube 3 on said portion of the wind instrument is necessary to be able to fasten the impedance variator 1 according to the invention on a portion of a wind instrument but this fastening means 5, 6 does not cooperate with the other elements 2, 3 to achieve the first purpose of the impedance variator 1, namely the suppression of the parasitic sounds.

The fastening means 5, 6 includes a plurality of worm screws 5, also referred to by the expression "needle screw" or "clamping screw"-penetrating into dedicated orifices of the brass tube 3 to come into contact and in abutment against the outer surface of the wind instrument portion. The fastening means 5, 6 further includes at least one setting knob 6 for screwing the worm screws so that these bear against the instrument portion and block the position of the impedance variator 1. Of course, it could be considered that each of the free ends of the worm screws 5 are provided with a setting knob 6 so as to facilitate positioning and locking of the worm screws 5.

In addition, for the fastening means 5, 6 to also participate in the first effect of the impedance variator 1, namely the reduction/suppression of the parasitic sounds, the setting knob(s) 6 is/are made of brass.

Advantageously, the worm screws 5 are made of a non-metallic material so as not to damage the wind instrument and not to disturb the output impedance of the instrument as well as the effects of the impedance variator 1.

In the embodiment shown in FIGS. 1 to 4, the impedance variator 1 includes two longitudinal spars 10 fastened on the external periphery of the brass tube 3. These spars 10 have a parallelepipedal shape over the entire longitudinal length of the brass tube 3. In this embodiment, the impedance variator 1 includes a worm 5 on the upper face of the impedance variator 1 whereas two pairs of worm screws 5 are present side-by-side, each of these pairs of worm screws 5 penetrating throughout the spars 10. The distribution of the upper worm screw 5 and of the two pairs of worm screws 5 consists of an 120° angular placement with respect to one another so that the worm screws 5 are symmetrically arranged or distributed over the periphery of the brass tube 3.

In the embodiment shown in FIGS. 5 and 6, the brass tube 3 is shorter and has only three worm screws 5 always arranged with an angle of 120° therebetween. In this embodiment, the upper worm screw 5 always penetrates the permanent magnet 2 but the other two worm screws 5 respectively penetrate into a nut 11, advantageously made of brass.

It could be noted herein that, in general, the term "worm screw" corresponds to a "threaded spindle" having a constant, or almost constant, diameter, over its entire length.

Advantageously, the permanent magnet 2 is a neodymium magnet. The permanent magnet 2 has an inner bore to let a threaded spindle 5 pass throughout the magnet 2.

Fastening of the elements to one another, in particular fastening of the spar 10 on the brass tube 3 and fastening of the permanent magnet 2 on the brass tube 3, is done according to methods and means well-known to a person skilled in the art, for example by welding, crimping or by gluing; the fastening modes may of course vary to fasten two types of the aforementioned elements.

The brass tube or ring 3 has a thickness comprised between 1 mm and 3 mm (millimetres), preferably 2 mm, a variable length and (internal) diameter depending on the wind instrument on which the impedance variator 1 according to the invention is mounted. Thus, in the case:

of a tenor saxophone, the length of the brass tube is 19 mm and has an inner diameter of 19 mm;

of an alto saxophone, the length of the brass tube is 17 mm and has an inner diameter of 18 mm;

of a flute, the length of the brass tube is 33 mm and has an inner diameter of 22 mm.

In general, the brass tube 3 has a length comprised between 15 mm and 35 mm and an inner diameter comprised between 15 mm and 25 mm.

When present fastened to the external face of the brass tube 3, The brass spar(s) 10, has/have a length equal to that of the tube 3, i.e. for example 19 mm for an alto saxophone, a thickness comprised between 1 mm and 5 mm, preferably 3 mm, and a width comprised between 5 mm and 9 mm, preferably 7 mm.

The worm screws or threaded spindles 5 have an external diameter adapted to the inner diameters of the brass spars 10, of the nuts 11 or of the permanent magnet 2 into which they penetrate. The length of the worm screws or of the threaded spindles 5 is comprised between 7 mm and 13 mm, preferably 10 mm and an outer diameter comprised between 3 m and 7 mm, equal to the value of the inner diameter of the spar(s) or of the nut(s).

Advantageously, the permanent magnet 2 is fastened on the brass tube 3 and has, in the embodiment chosen to illustrate the invention, the following dimensions:

an inner diameter of 7 mm, an outer diameter of 10 mm, a thickness of 3 mm.

The dimensions of the aforementioned elements—in the specific embodiment or in their more general or wide range—are advantageous to achieve the main effect of the impedance variator 1, namely the limitation and possibly the suppression of parasitic sounds. Of course, these dimensions are primarily important for the brass tube 3 and the permanent magnet 2 and then advantageously for the brass spar 10, the setting knob 6 and the nut 11.

As indicated before, the impedance variator 1 may have a colour that is suitable or aesthetic with regards to the wind instrument, or in particular thanks to varnishing or platinising or plating with silver or gold, preferably with a thickness of 6 microns.

Advantageously, all of the indicated elements 2, 3, 6, 10, 11 are made of brass, namely of an alloy essentially of copper and zinc, at variable proportions. Preferably, all these elements 2, 3, 6, 10, 11 consist of the same brass, i.e. a brass having exactly the same components in the same relative amounts.

Amongst the three categories of brass, namely simple brasses or binary alloy brasses containing only copper and zinc, lead brasses containing from 1 to 3% by weight of lead and special brasses comprising in particular one or more of the elements selected from among tin, aluminium, arsenic, magnesium, nickel, iron, silicon, etc., the brass elements in the impedance variator according to the invention consists of simple or binary alloy brasses.

As shown in FIG. 7, when the impedance variator according to the invention is fastened on an alto 20, tenor or baryton saxophone, consists of a brass ring 3 clasping the jar by means of three nylon needle screws, opposite one another according to a 120° pitch, the tightening screw(s) being equipped with a permanent magnet. The impedance variator 1 according to the invention is fastened before the spout 21 through the spout 21 or around the spout 21 and then fixing it beyond the latter 21.

Thus, the impedance variator 1 is movable and can easily be moved for setting according to the desire of the musician or instrumentalist. In particular, this setting allows obtaining a brighter sound or, on the contrary, dark sound.

As shown in FIG. 8, the impedance variator is mounted or fastened on a clarinet 30 identically to the manner described hereinabove with reference to a saxophone 20. Thus, the impedance variator 1 consists of a brass ring 3 clasping the barrel of the clarinet 30 and is positioned before the spout 21 and can be moved easily.

In the case of a flute, not shown in the appended figures, the impedance variator 1 grasps the flute head before the mouthpiece plate.

Once mounted or fastened on the wind instrument 20 or 30, the distance between the wall of the portion of the wind instrument and the brass tube or ring is comprised between 1 mm and 5 mm, preferably between 2 mm and 4 mm, and of course this distance is part of the setting performed by the instrumentalist or the musician to obtain the desired effects.

Although the invention has been described in connection with several particular embodiments, it is obvious that it is in no way limited thereto and that it comprises all of the technical equivalents of the described means as well as their combinations if these fall within the scope of the invention.

The arrangement of the different elements and/or of the means and/or steps of the invention, in the above-described embodiments, should not be understood as requiring such an arrangement in all implementations. In any case, it should be understood that various modifications could be made to these elements and/or means and/or steps, without departing from the spirit and the scope of the invention. In particular:

- the brass tube or ring 3 may comprise at least one portion made of another material, for example at either one of the two longitudinal ends of the tube, the selected material being advantageously easy to bond with the brass, for example copper, tin, nickel, chromium or magnesium or a mixture of these materials;
- the making of the setting means 5, 6 may consist of a different assembly of mechanical elements or of electromechanical means such as, for example, a worm screw driven using an electric motor;
- the permanent magnet 2 may consist of any ferromagnetic material other than a neodymium magnet, it being understood that the impedance variator 1 according to the invention may have a plurality of permanent magnets 2, possibly or advantageously having different dimensions.

The use of the verb “include”, “comprise” or “contain” and of its conjugated forms does not exclude the presence of other elements or other steps than those set out in a claim.

In the claims, any reference sign between brackets should not be interpreted as a limitation of the claim.

The invention claimed is:

1. An impedance variator for limiting or suppressing the parasitic harmonics of a wind musical instrument, the impedance variator comprising:

at least one permanent magnet, and a brass tube configured to surround a substantially tubular or cylindrical portion of the wind instrument and a means for fastening the tube on said portion of the wind instrument, wherein the fastening means includes a plurality of worm screws each penetrating throughout the tube, the inner end of each worm screw bearing against the outer surface of the portion of the wind instrument, the penetration length of each worm screw inside the tube being adjustable, and the worm screws are distributed or arranged over the circumference of the tube while forming an angle between 100° and 140°.

2. The impedance variator according to claim 1, wherein the brass tube has a thickness between 1 mm and 3 mm.

3. The impedance variator according to claim 1, wherein the worm screws are distributed or arranged over the circumference of the tube while forming an angle of 120° therebetween.

4. The impedance variator according to claim 1, wherein the fastening means further comprises at least one brass setting knob, fastened at the outer end of a worm screw, for setting the penetration length of the worm screw into the tube.

5. The impedance variator according to claim 4, wherein each worm screw includes, at its outer end, a brass setting knob.

6. The impedance variator according to claim 1, wherein the worm screws are made of a non-metallic material.

7. The impedance variator according to claim 1, wherein the permanent magnet is fastened on the brass tube, outside said tube.

8. The impedance variator according to claim 1, wherein the internal diameter of the brass tube is between 15 mm and 25 mm.

9. The impedance variator according to claim 1, wherein at least one spar is fastened on the outer surface of the brass tube, and the at least one spar extends in a lengthwise direction of the tube.

10. The impedance variator according to claim 1, wherein the outer surface of the brass tube is varnished or platinised or plated with silver or gold, and the silver or gold plating has a thickness of 6 microns.

11. The impedance variator according to claim 5, wherein the permanent magnet has an external diameter comprised between 12 and 18 mm.

12. A wind instrument having an impedance variator according to claim 1, fixed between two wall portions of said wind instrument, extending substantially parallel to one another.

13. The wind instrument according to claim 12, wherein said instrument includes a spout and the impedance variator is fixed at a distance from the spout comprised between 0.5 cm and 2.5 cm.

14. The impedance variator according to claim 2, wherein the worm screws are distributed or arranged over the circumference of the tube while forming an angle of 120° therebetween.

15. The impedance variator according to claim 6, wherein the permanent magnet has an external diameter comprised between 12 and 18 mm.

* * * * *